United States Patent
You et al.

(10) Patent No.: US 12,034,137 B2
(45) Date of Patent: Jul. 9, 2024

(54) MOUNTING BRACKET FOR CELL SUPERVISION CIRCUIT, BATTERY PACK, AND VEHICLE

(71) Applicant: Contemporary Amperex Technology Co., Limited, Ningde (CN)

(72) Inventors: Kaijie You, Ningde (CN); Linggang Zhou, Ningde (CN); Derong Wang, Ningde (CN); Libing Chan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 123 days.

(21) Appl. No.: 16/962,605

(22) PCT Filed: Dec. 28, 2018

(86) PCT No.: PCT/CN2018/124862
§ 371 (c)(1),
(2) Date: Jul. 16, 2020

(87) PCT Pub. No.: WO2019/141067
PCT Pub. Date: Jul. 25, 2019

(65) Prior Publication Data
US 2020/0411928 A1 Dec. 31, 2020

(30) Foreign Application Priority Data

Jan. 19, 2018 (CN) .......................... 201820090372.1

(51) Int. Cl.
*H01M 10/6554* (2014.01)
*H01M 10/42* (2006.01)
(Continued)

(52) U.S. Cl.
CPC ..... *H01M 10/6554* (2015.04); *H01M 10/425* (2013.01); *H01M 10/613* (2015.04);
(Continued)

(58) Field of Classification Search
CPC ........... H01M 10/6554; H01M 10/425; H01M 10/613; H01M 10/653; H01M 10/625;
(Continued)

(56) References Cited

U.S. PATENT DOCUMENTS

| 2011/0206948 A1* | 8/2011 | Asai | ...................... H01M 50/20 429/7 |
| 2012/0298433 A1* | 11/2012 | Ohkura | ............... H01M 10/647 180/65.21 |

(Continued)

FOREIGN PATENT DOCUMENTS

| CN | 204966568 U | 1/2016 |
| CN | 207719292 U | 8/2018 |
| EP | 2362463 A2 | 8/2011 |
| JP | 2013229266 A | 11/2013 |
| JP | 5916500 B2 * | 5/2016 |

OTHER PUBLICATIONS

Izekoe. JP5916500B2. May 11, 2016. English machine translation by EPO. (Year: 2016).*

(Continued)

*Primary Examiner* — James Lee
(74) *Attorney, Agent, or Firm* — East IP P.C.

(57) ABSTRACT

This disclosure relates to the technical field of energy storage devices, and in particular, to a mounting bracket for a cell supervision circuit, a battery pack, and a vehicle. The mounting bracket includes: a management system mounting part, including a management system mounting surface, which is configured to mount a cell supervision circuit; and a thermally conductive part, configured to fit snugly to a container of the battery pack, which is connected to one end of the management system mounting part, and disposed on a side where the management system mounting surface is located.

17 Claims, 5 Drawing Sheets

(51) Int. Cl.
  *H01M 10/613* (2014.01)
  *H01M 10/625* (2014.01)
  *H01M 10/647* (2014.01)
  *H01M 10/653* (2014.01)
  *H01M 50/209* (2021.01)
  *H01M 50/244* (2021.01)

(52) U.S. Cl.
  CPC ....... *H01M 10/625* (2015.04); *H01M 10/647* (2015.04); *H01M 10/653* (2015.04); *H01M 50/209* (2021.01); *H01M 50/244* (2021.01); *H01M 2220/20* (2013.01)

(58) Field of Classification Search
  CPC . H01M 10/647; H01M 50/20; H01M 2220/20
  See application file for complete search history.

(56) References Cited

U.S. PATENT DOCUMENTS

| | | |
|---|---|---|
| 2013/0143079 A1 | 6/2013 | Huang et al. |
| 2017/0133723 A1 | 5/2017 | Yang et al. |
| 2017/0194674 A1* | 7/2017 | Lee .................... H01M 50/572 |

OTHER PUBLICATIONS

PCT International Search Report for PCT/CN2018/124862, dated Mar. 8, 2019, 14 pages.

The extended European search report for EP Application No. 18901055.6, dated Jan. 12, 2021, 6 pages.

The First Office Action for EP Application No. 18901055.6, dated Aug. 17, 2021, 3 pages.

* cited by examiner

MOUNTING BRACKET FOR CELL SUPERVISION CIRCUIT, BATTERY PACK, AND VEHICLE

CROSS-REFERENCE TO RELATED APPLICATION

This application is a National Stage of International Application No. PCT/CN2018/124862, filed on Dec. 28, 2018, which claims priority to Chinese Patent Application No. 201820090372.1, filed on Jan. 19, 2018, both of which are incorporated herein by reference in their entireties.

TECHNICAL FIELD

This application relates to the technical field of energy storage devices, and in particular, relates to a mounting bracket for a cell supervision circuit, a battery pack, and a vehicle.

BACKGROUND

Currently, strict requirements are imposed on power batteries in terms of cost, size, energy density, and other aspects; to meet these requirements, not only battery cells need to be continuously optimized, but other components in a battery pack also need to be continuously optimized in terms of weight, size, assembly time, cost, and other aspects while strength and performance requirements are satisfied. A cell supervision circuit (CSC) is a control system in a battery pack; in the prior art, there is no fixed position for the cell supervision circuit in the battery pack; and after other components are mounted, the cell supervision circuit is mounted wherever there is free space. In most cases, the mounting position is affected by other surrounding components; consequently, it difficult to conduct heat from the cell supervision circuit out of the battery pack; under a high temperature for a long time, the cell supervision circuit will have decreased performance and will be damaged in severe cases, which thereby affects safety of the battery pack.

SUMMARY

This disclosure provides a mounting bracket for a cell supervision circuit, a battery pack, and a vehicle to solve the above problems.

A first aspect of this disclosure provides a mounting bracket for a cell supervision circuit, including:
  a management system mounting part, including a management system mounting surface, wherein the management system mounting surface is configured to mount a cell supervision circuit; and
  a thermally conductive part, configured to fit snugly to a container of a battery pack, wherein the thermally conductive part is connected to one end of the management system mounting part, and disposed on a side where the management system mounting surface is located.

Optionally, the mounting bracket further includes one or more module pressing parts; each module pressing part is connected to an end of the management system mounting part away from the thermally conductive part, and the module pressing part and the thermally conductive part are located on two sides of the management system mounting part respectively.

Optionally, the mounting bracket further includes a force balancing structure, and the force balancing structure is disposed on at least one of the management system mounting part and the module pressing part.

Optionally, the mounting bracket further includes a connecting bolt;
  the management system mounting part includes a plurality of through-holes, some of which are mounting holes, and others are spare holes; each mounting hole is connected to the connecting bolt, and the connecting bolt and the management system mounting surface are located on the same side.

Optionally, a container mounting part is disposed on two sides of the thermally conductive part, the container mounting part includes a container mounting surface, and the container mounting surface is perpendicular to the management system mounting surface.

Optionally, the mounting bracket has an integrated structure.

A second aspect of this disclosure provides a battery pack, including:
  a container;
  a battery module, including an end plate;
  any of the above mounting brackets, where the management system mounting part is oppositely disposed on one side of the end plate; and the thermally conductive part fits snugly to the container; and
  a cell supervision circuit, where the cell supervision circuit is mounted on the management system mounting surface.

Optionally, an outer contour of the thermally conductive part is consistent with an outer contour of the container.

Optionally, the battery pack further includes a module pressing part; the module pressing part is connected to an end of the management system mounting part away from the thermally conductive part, and the module pressing part and the thermally conductive part are located on two sides of the management system mounting part respectively;
  a plurality of battery modules are disposed, and the module pressing part is connected onto and presses adjacent end plates concurrently.

Optionally, the container includes an upper container part and a lower container part that engage with each other;
  a container mounting part is disposed on two sides of the thermally conductive part, the container mounting part includes a container mounting surface, and the container mounting surface is perpendicular to a direction of engaging the upper container part with the lower container part.

Optionally, the battery pack further includes a thermally conductive adhesive; the thermally conductive adhesive is disposed on at least one of a side of the management system mounting part away from the management system mounting surface and a surface of the thermally conductive part which fits snugly to the container.

A third aspect of this disclosure provides a vehicle, including any of the above battery packs.

The technical solutions according to this disclosure achieve the following beneficial effects:
  the mounting bracket according to this disclosure includes a management system mounting part and a thermally conductive part; the heat from the cell supervision circuit can be transmitted to the container through the thermally conductive part such that the heat inside the container will be dissipated quickly, which will maximally ensure a proper working temperature of the cell supervision circuit and improve reliability of the cell supervision circuit and safety of the battery pack.

It should be understood that the above general description and the following detailed description are only exemplary without limiting this disclosure.

REFERENCE NUMERALS

Figure 1:
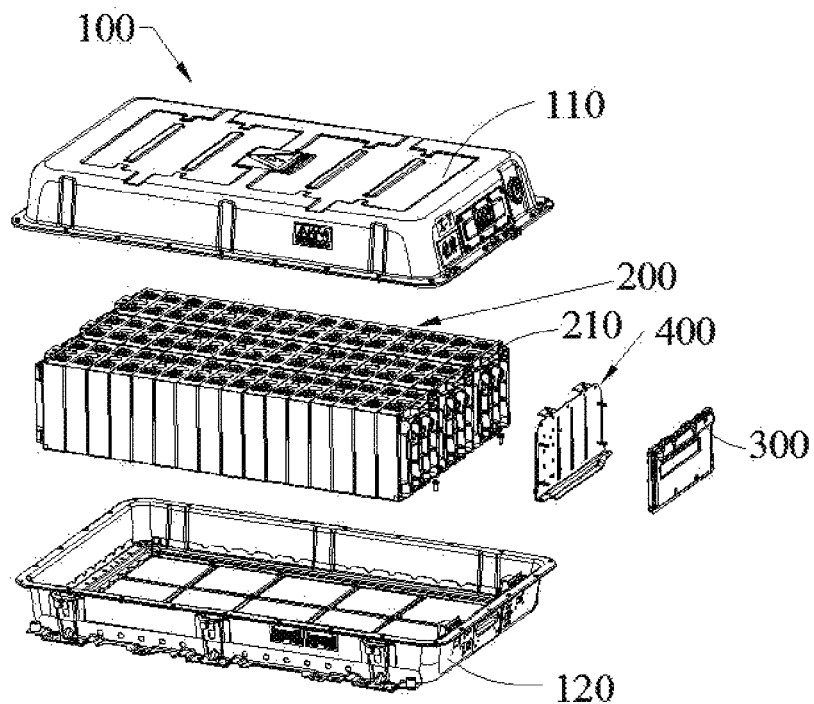
FIG. 1 is an exploded view of a specific embodiment of a battery pack according to this disclosure.
Figure 2:
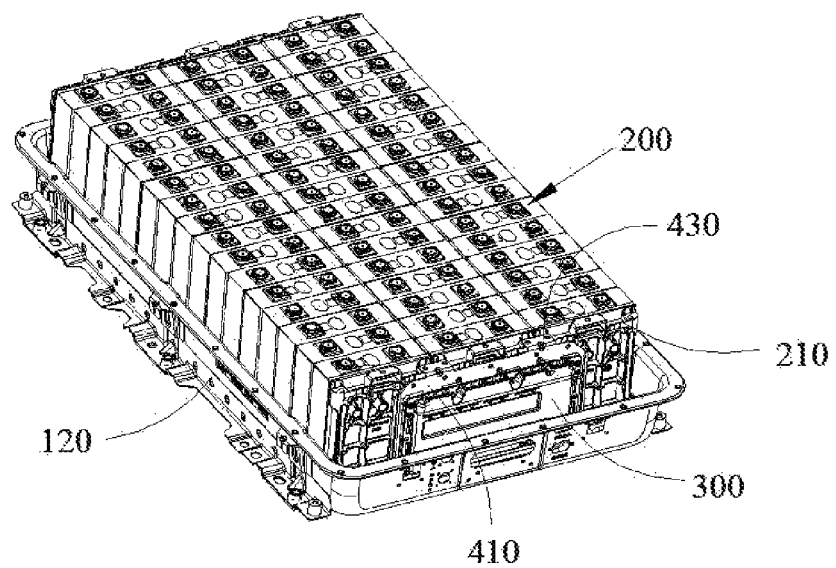
FIG. 2 is a schematic structural diagram of a specific embodiment of a battery pack according to this disclosure without showing an upper container part.

100: Container;
110: Upper container part;
120: Lower container part;
130: Step;
200: Battery module;
210: End plate;
300: Cell supervision circuit;
400: Mounting bracket;
410: Management system mounting part;
411: Management system mounting surface;
420: Thermally conductive part;
430: Module pressing part;
440: Container mounting part;
441: Container mounting surface;
450: Force balancing structure;
451: Tear-resistant groove;
452: Tear-resistant hole;
453: Bent flange;
460: Connecting bolt;
470: Spare hole;
480: Harness fixing hole;
500: Connection harness.

The drawings described here are incorporated into the specification as a part of the specification, and illustrate embodiments of this disclosure and are used together with the specification to interpret the principles of this disclosure.

DETAILED DESCRIPTION

Below, this disclosure will be further described in detail with reference to specific embodiments and accompanying drawings.

As shown in FIG. 1 to FIG. 10, an embodiment of this disclosure provides a battery pack, including a container 100, a battery module 200, a cell supervision circuit 300, and a mounting bracket 400; the battery module 200 includes an end plate 210; the cell supervision circuit 300 is mounted on the mounting bracket 400; and the battery module 200, the cell supervision circuit 300, and the mounting bracket 400 are all contained in the container 100.

Figure 5:
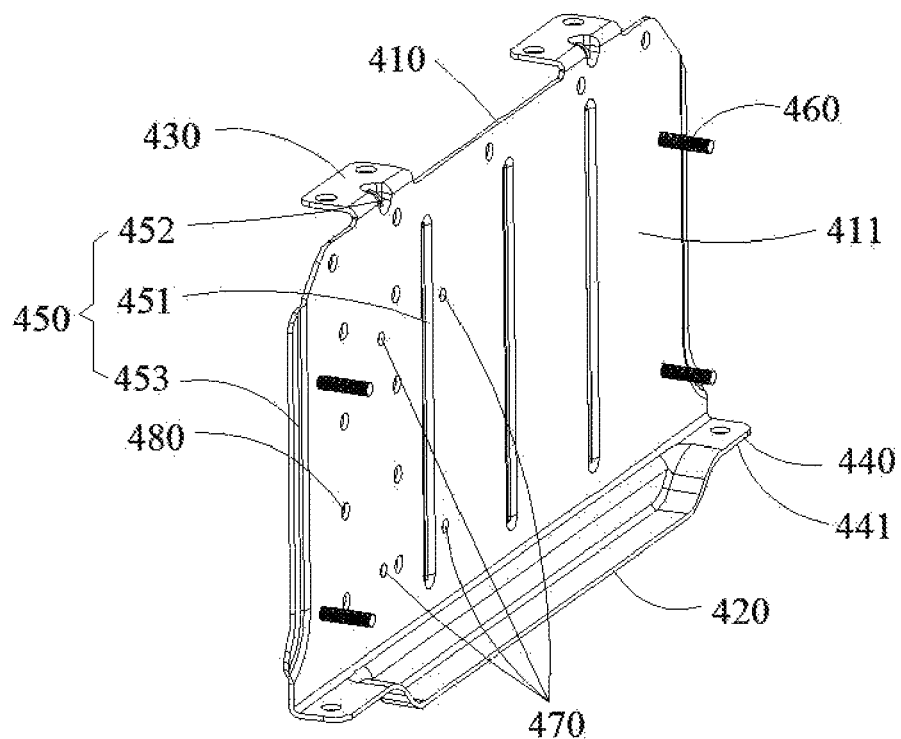
FIG. 5 is a schematic structural diagram of a specific embodiment of a mounting bracket according to this disclosure.
Figure 6:
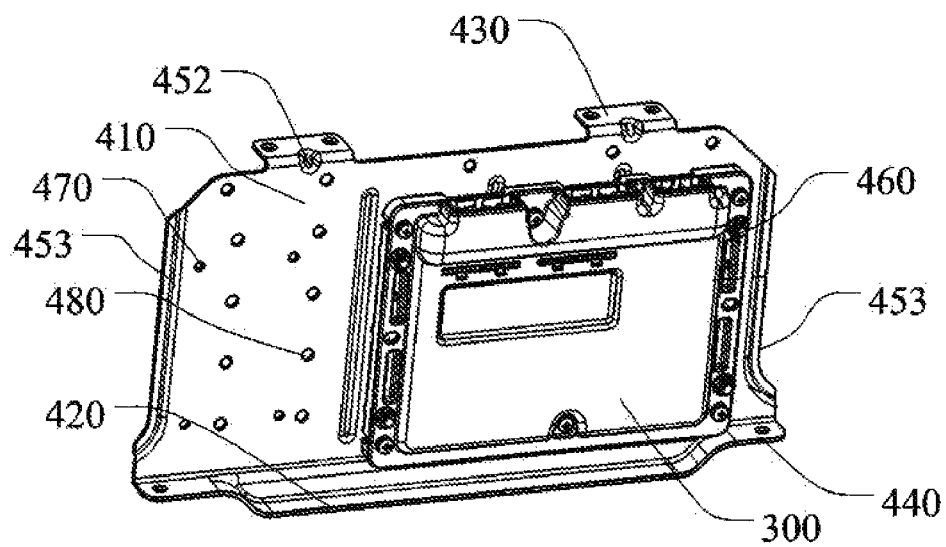
FIG. 6 is an assembly diagram of a specific embodiment of a mounting bracket and a cell supervision circuit according to this disclosure.
Figure 7:
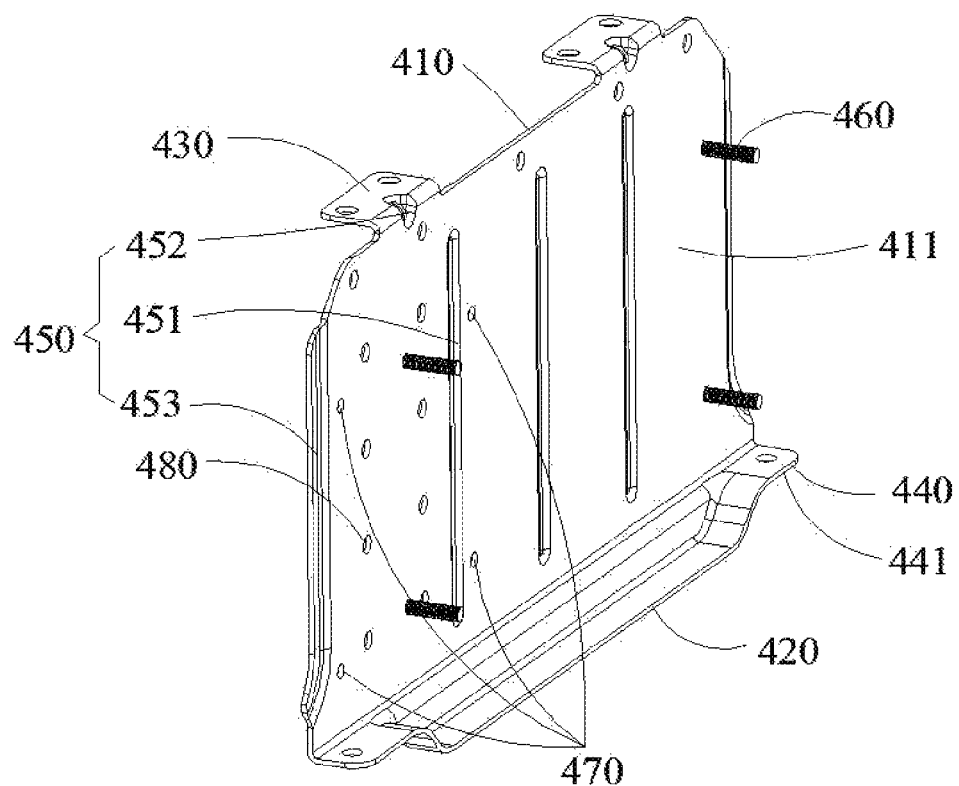
FIG. 7 is a schematic structural diagram of another specific embodiment of a mounting bracket according to this disclosure.
Figure 8:
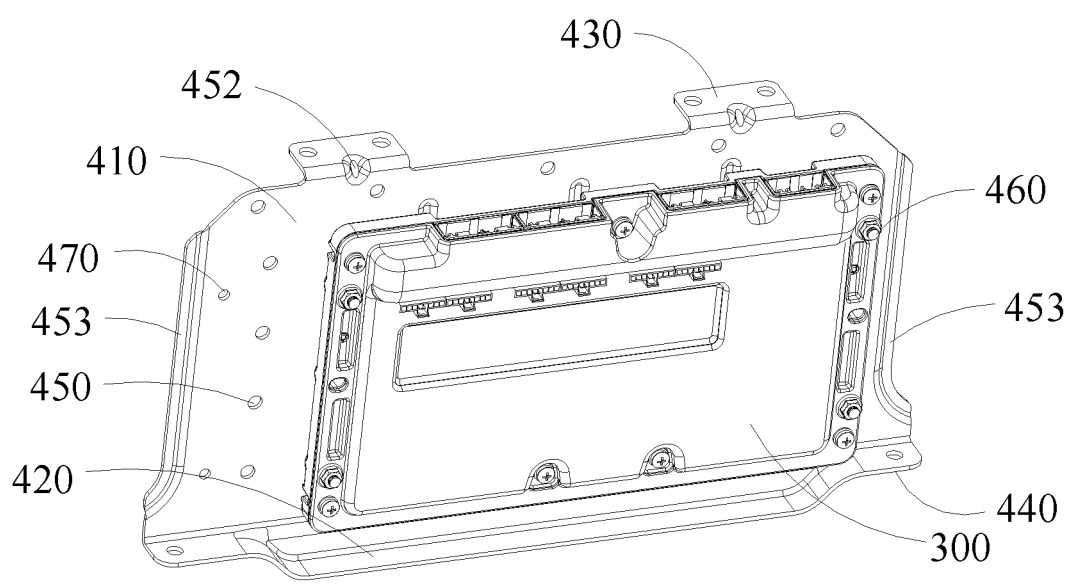
FIG. 8 is an assembly diagram of another specific embodiment of a mounting bracket and a cell supervision circuit according to this disclosure.
Figure 9:
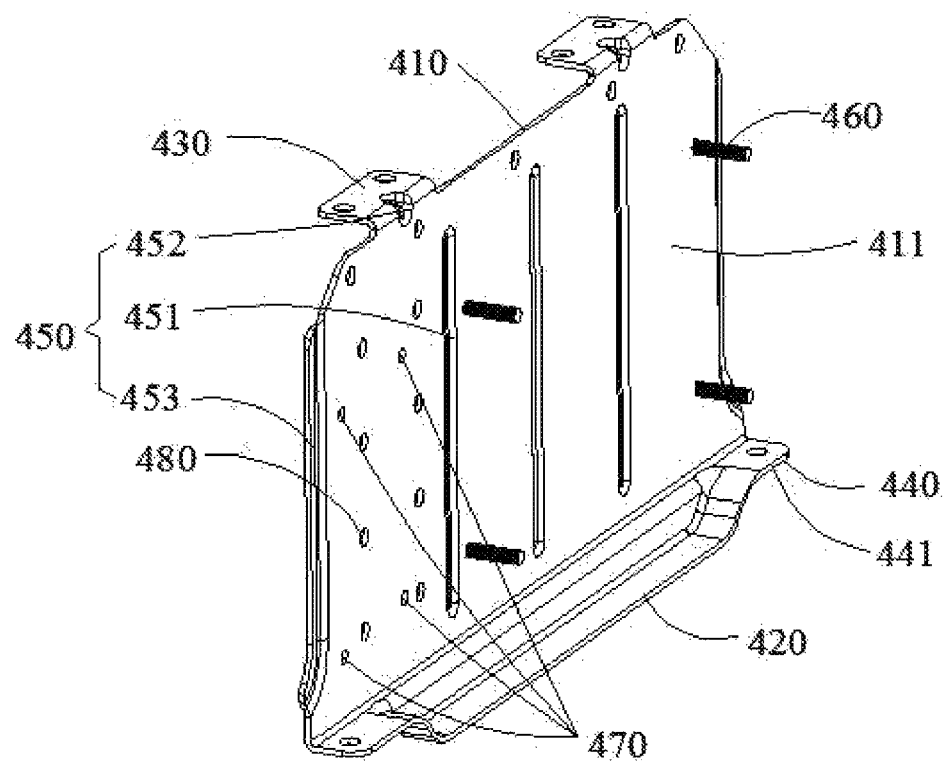
FIG. 9 is a schematic structural diagram of still another specific embodiment of a mounting bracket according to this disclosure.
Figure 10:
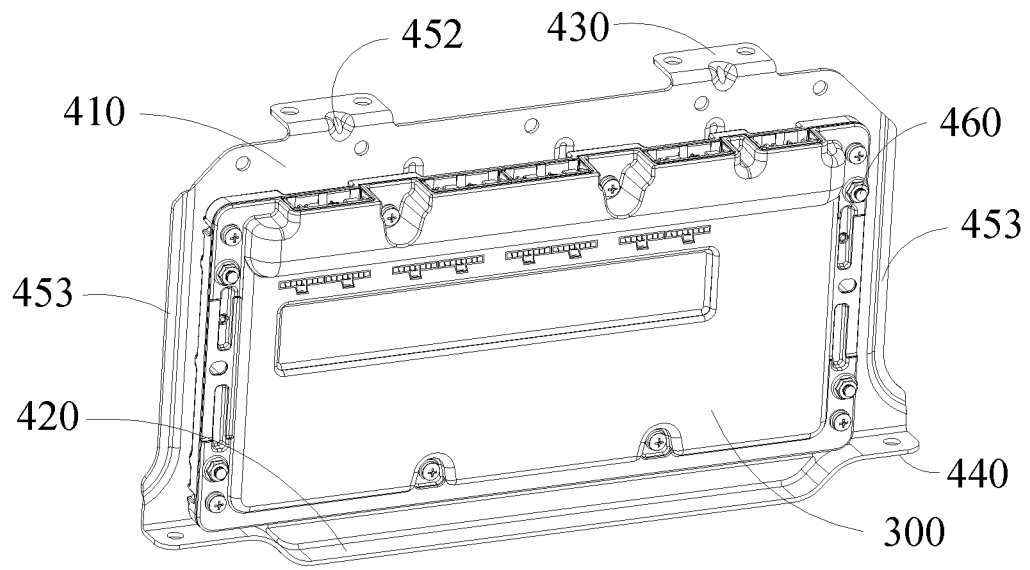
FIG. 10 is an assembly diagram of still another specific embodiment of a mounting bracket and a cell supervision circuit according to this disclosure.

Specifically, as shown in FIG. 5, FIG. 7, and FIG. 9, the mounting bracket 400 includes a management system mounting part 410 and a thermally conductive part 420; the management system mounting part 410 includes a management system mounting surface 411, and the management system mounting surface 411 is configured to mount the cell supervision circuit 300; the thermally conductive part 420 is disposed to fit snugly to the container 100 of the battery pack; the thermally conductive part 420 is connected to one end of the management system mounting part 410, and disposed on a side where the management system mounting surface 411 is located, i.e., the thermally conductive part 420 is bent with respect to the management system mounting part 410 and extends in a direction away from the management system mounting part 410. In assembling of the battery pack, the management system mounting part 410 is oppositely disposed on one side of the end plate 210 of the battery module 200, i.e., the management system mounting part 410 is disposed to face the end plate 210 and is located on one side of the end plate 210; and the cell supervision circuit 300 is mounted on the management system mounting surface 411, and the thermally conductive part 420 fits snugly to the container 100.

The above mounting bracket 400 includes the management system mounting part 410 and the thermally conductive part 420; a position for fixing the cell supervision circuit 300 is provided in the battery pack such that heat from the cell supervision circuit 300 can be transmitted through the management system mounting part 410 and the thermally conductive part 420 to the container 100 and thereby the heat inside the container 100 will be dissipated quickly, which will maximally ensure a proper working temperature of the cell supervision circuit 300 and improve reliability of the cell supervision circuit 300 and safety of the battery pack.

The management system mounting part 410 may fit snugly to the end plate 210 to increase a support capacity of the mounting bracket 400 and implement more reliable mounting of the cell supervision circuit 300.

Further, an outer contour of the thermally conductive part 420 is consistent with an outer contour of the container 100, i.e., the thermally conductive part 420 has a conformal shape of the container 100; and when the thermally conductive part 420 and the container 100 are mounted, it is desirable to make respective portions of the thermally conductive part 420 fits snugly to the container 100 to improve heat conduction efficiency and mounting stability of the mounting bracket 400.

The battery pack may further include a thermally conductive adhesive; the thermally conductive adhesive is disposed on at least one of a side of the management system mounting part 410 away from the management system mounting surface 411 and a surface of the thermally conductive part 420 which fits snugly to the container 100; in other words, the thermally conductive adhesive may be disposed on only the side of the management system mounting part 410 away from the management system mounting surface 411, i.e., the thermally conductive adhesive is disposed between the management system mounting part 410 and the end plate 210 to transmit the heat from the battery module 200 through the mounting bracket 400 to the container 100, or alternatively, the thermally conductive adhesive may be disposed on only the surface of the thermally conductive part 420 which fits snugly to the container 100, i.e., the thermally conductive adhesive is disposed between the thermally conductive part 420 and the container 100 so as to further improve the heat conduction efficiency of the mounting bracket 400 and the container 100. The thermally conductive adhesive may also be disposed on both the side of the management system mounting part 410 away from the management system mounting surface 411 and the surface of the thermally conductive part which fits snugly to the container 100.

The mounting bracket 400 further includes a module pressing part 430; the module pressing part 430 is connected to the other end of the management system mounting part 410 away from the thermally conductive part 420, and the module pressing part 430 and the thermally conductive part 420 are located on two sides of the management system mounting part 410 respectively; in other words, the module pressing part 430 extends in a direction away from the management system mounting part 410, wherein an extending direction of the module pressing part 430 is opposite to and not collinear with an extending direction of the thermally conductive part 420; and the module pressing part 430 disposed in such a way that the mounting bracket 400 is also fastened to the battery module 200, which will better improve internal stability of the battery pack.

It should be understood that one or more battery modules 200 may be disposed in the battery pack; and in a case that a plurality of battery modules are disposed, a module batten may be disposed additionally to fasten the adjacent battery modules 200. In an embodiment of this disclosure, the module pressing part 430 is also connected onto and presses adjacent end plates 210 concurrently, i.e., two adjacent end plates 210 may be connected to the same module pressing part 430; obviously, in this way, the module pressing part 430 serves as the module batten; therefore, the battery pack will require fewer module battens, and the mounting bracket 400 will increase connection points between the battery modules 200 and the container 100, and achieve higher stability of the battery modules 200.

Figure 4:
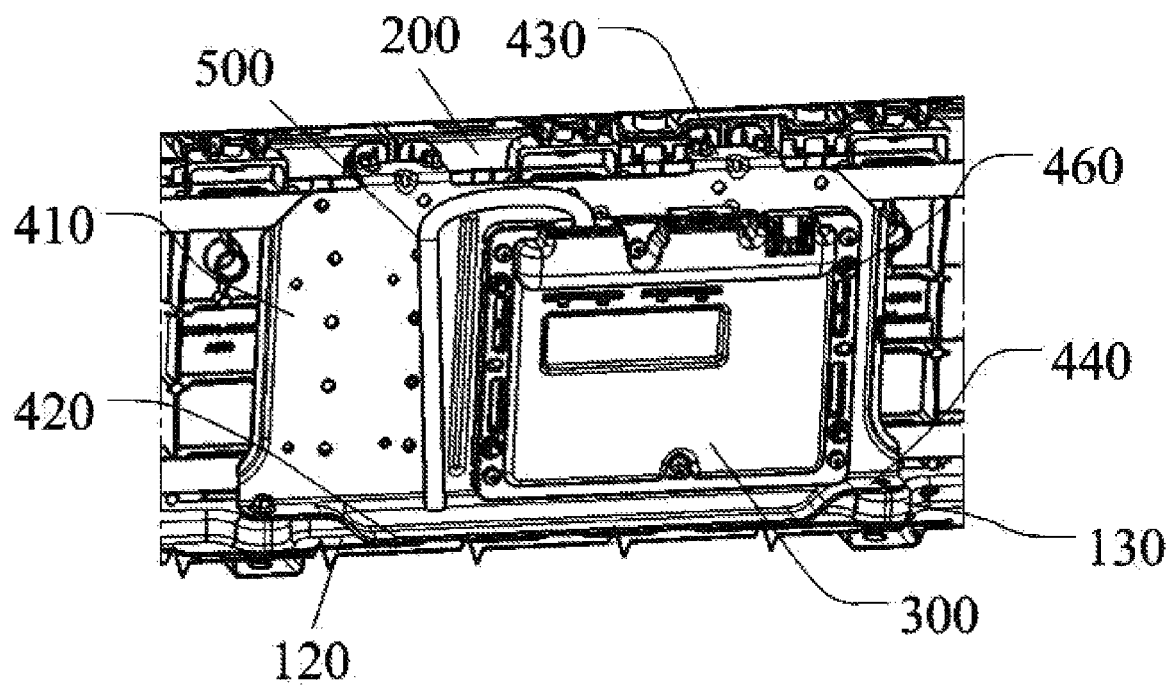
FIG. 4 is a schematic diagram of a local structure of a specific embodiment of a battery pack according to this disclosure.

In a case that three or more battery modules 200 are disposed, a plurality of module pressing parts 430 are disposed; one module pressing part 430 is connected onto and presses the end plates 210 of two adjacent battery modules 200 concurrently; as shown in FIG. 4, three battery modules 200 are disposed, and two module pressing parts 430 are disposed, and each module pressing part 430 is connected to two adjacent end plates 210 by screws; and the two adjacent end plates 210 may be fastened to the module pressing part 430 by one screw.

Herein, the container 100 includes an upper container part 110 and a lower container part 120 that engage with each other; in the mounting of the battery pack, the upper container part 110 is opened first, the battery module 200, the cell supervision circuit 300, the mounting bracket 400, and other parts in the battery pack are mounted in the lower container part 120, and then the upper container part 110 is engaged with the lower container part 120 to form the battery pack.

Figure 3:
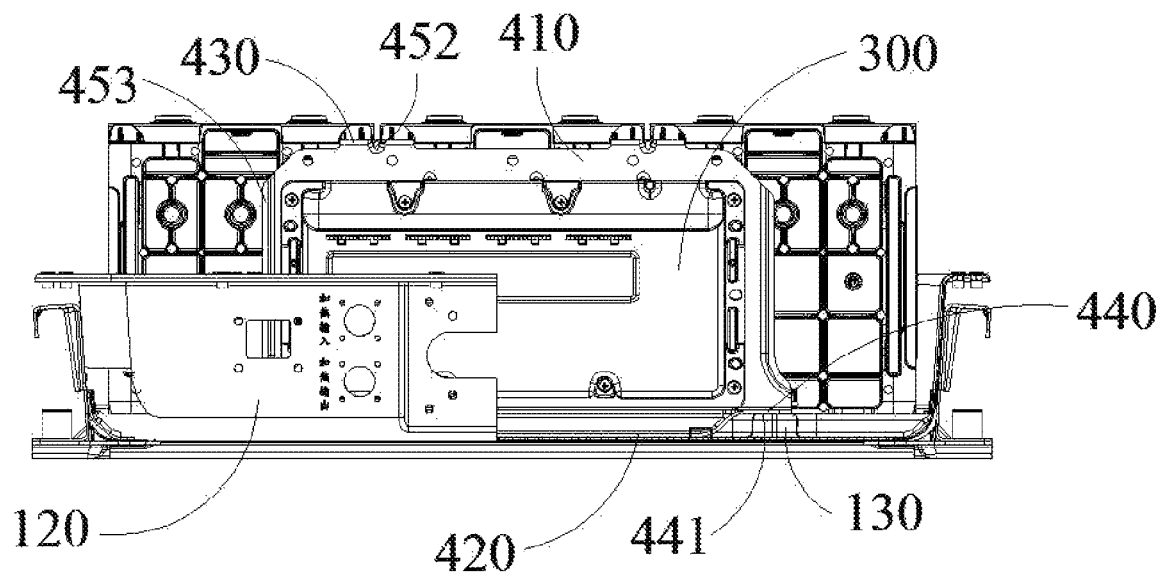
FIG. 3 is a side view of a specific embodiment of a battery pack according to this disclosure without showing an upper container part and a part of a lower container part.

The mounting bracket 400 may be connected to the container 100 through the thermally conductive part 420; in an embodiment, container mounting parts 440 are disposed on two sides of the thermally conductive part 420; the container mounting part 440 includes a container mounting surface 441; the container mounting surface 441 is perpendicular to the management system mounting surface 411; in the fixing of the mounting bracket 400 onto the container 100, the container mounting surface 441 is perpendicular to a direction of engaging the upper container part 110 with the lower container part 120, as shown in FIG. 3; in this way, screws are arranged along the engaging direction to lock the mounting bracket 400 and the container 100 firmly.

The cell supervision circuit 300 is a wearing part, and therefore, often needs to be replaced and repaired. In the prior art, there is no fixed position for the mounting bracket 400 in the battery pack; at some locations, when the cell supervision circuit 300 is disassembled and the mounting bracket 400 is mounted, there is no enough operating space, and the whole battery module needs to be disassembled and after the replacement, be reassembled, thus it is labor and time consuming to replace the cell supervision circuit 300. With the above container mounting part 440, after the upper container part 110 is opened during disassembly and repair, the screws that connect the mounting bracket 400 to the container 100 and the screws that connect the mounting bracket 400 to the end plate 210 are all disposed vertically, and no other parts are disposed above the screws, thus this manner will provide an enough operating space to make the replacement of the cell supervision circuit 300 more convenient and improve efficiency of replacing and repairing the cell supervision circuit 300.

To increase strength of the container 100, the container 100 may include a step 130 recessed inward; the step 130 may be disposed on both the upper container part 110 and the lower container part 120; the container mounting part 440 is snugly connected to the step 130; in this way, a recessed space will be formed outside the container 100, and will be available for accommodating screws and increase the strength of the container 100. In this case, the thermally conductive part 420 protrudes outward with respect to the container mounting part 440, so as to be as close as possible to the container 100.

The container mounting part 440 may be transitionally connected to the thermally conductive part 420 through an arc-shaped surface; specifically, the container mounting part 440 and the thermally conductive part 420 may be formed by a flange of the management system mounting part 410 to increase the strength of the entire mounting bracket 400.

Optionally, the mounting bracket 400 has an integrated structure to increase the strength of the mounting bracket 400. Each of the management system mounting part 410, the thermally conductive part 420, the module pressing part 430, and the container mounting part 440 may have a plate-shaped structure; in a case that the mounting bracket 400 has an integrated structure, each of the module pressing part 430, the container mounting part 440, and the thermally conductive part 420 are bent and formed with respect to the management system mounting part 410.

Further, the mounting bracket 400 further includes a force balancing structure 450; the force balancing structure 450 is disposed on at least one of the management system mounting part 410 and the module pressing part 430 to better increase the strength of the mounting bracket 400.

The force balancing structure 450 may be a tear-resistant groove 451; the tear-resistant groove 451 is disposed on the management system mounting part 410, and the tear-resistant groove 451 is formed by recessing inward the management system mounting surface 411, i.e., by recessing toward the end plate 210; this structure enables a majority of areas of the management system mounting surface 411 to contact the cell supervision circuit 300, thereby improving heat dissipation effects of the cell supervision circuit 300.

In an embodiment, especially in a case that the mounting bracket 400 is integrally formed, due to a relatively large internal force caused by the bending near the module pressing part 430, an tear-resistant groove 451 is disposed in at least an area of the management system mounting part 410 near the module pressing part 430, so as to improve the strength of the area and prevent a tear from occurring in the area.

As mentioned above, in a case that the mounting bracket 400 has an integrated structure, a junction between the management system mounting part 410 and the module pressing part 430 is likely to fracture due to the bending; therefore, a force balancing structure 450 is disposed at the junction between the management system mounting part 410 and the module pressing part 430 to increase the strength at the junction and ensure reliability of the connection between the management system mounting part 410 and the module pressing part 430; the force balancing structure 450 at this junction may be a tear-resistant hole 452, as shown in FIG. 5, FIG. 7, and FIG. 9, so as to better release the internal force caused by the bending and prevent a fracture at the junction.

It needs to be noted that the tear-resistant hole 452 may also be disposed on the management system mounting part 410, and the tear-resistant groove 451 may also be disposed at the junction between the management system mounting part 410 and the module pressing part 430.

In addition, the force balancing structure 450 may further include a bent flange 453; the bent flange 453 is disposed along at least a part of the edge of the management system mounting part 410 to form a flanging structure; as shown in FIG. 5, FIG. 7, and FIG. 9, the bent flange 453 is disposed in a section of the edge of the management system mounting part 410 between the module pressing part 430 and the container mounting part 440; because the management system mounting part 410 is large in size, such flanging structure can further improve the strength of the mounting bracket 400.

A plurality of through-holes are disposed on the management system mounting part 410; among the through-holes, some are mounting holes and others are spare holes 470, so as to adapt to cell supervision circuits 300 of different specifications. Specifically, each mounting hole may be connected with a connecting bolt 460, and the connecting bolt 460 and the management system mounting surface 411 are located on the same side of the management system mounting part 410. In this way, external structures of the cell supervision circuits 300 are similar, and the cell supervision circuits 300 of different specifications differ only in lengthwise size, thus in manufacturing of the mounting bracket 400, all other structures of the mounting bracket 400 than the connecting bolt 460 are processed and formed first, and finally, the connecting bolt 460 is connected to the mounting hole according to different cell supervision circuits 300. As shown in FIG. 5 to FIG. 10 that illustrate three embodiments of the mounting bracket 400 and assembly diagrams of fixing the mounting bracket 400 of the corresponding embodiments to different cell supervision circuits 300, the three embodiments differ only in the location of the connecting bolt 460, so as to adapt to mounting of different cell supervision circuits 300. Obviously, this structure will improve structural consistency of the mounting bracket 400, increase universal applicability of the mounting bracket 400, reduce the quantity of processing molds for the mounting bracket 400, reduce cost, and facilitate the design of the entire battery pack. It needs to be noted that the cell supervision unit 300 may also be connected to the mounting hole by other means, or directly clamped, welded, or otherwise connected to the mounting bracket 400.

Optionally, the mounting bracket 400 may also include a heat dissipation hole, and the heat dissipation hole may also be a through-hole to facilitate heat dissipation of the cell supervision circuit 300.

As shown in FIG. 4, the cell supervision circuit 300 needs to be connected to other parts in the battery pack through a connection harness 500, i.e., the battery pack further includes a connection harness 500; to prevent vibration of the connection harness 500 from affecting the entire battery pack during transportation and use of the battery pack, a harness fixing hole 480 is further disposed on the management system mounting part 410; the harness fixing hole 480 may be a through-hole or a blind hole; after the connection harness 500 is connected, the connection harness 500 is fastened to the harness fixing hole 480 through a band, a wire clip, or the like.

In conclusion, in other words, the mounting bracket 400 may include a plurality of through-holes; the through-holes include the mounting holes and spare holes adapted to mount the cell supervision circuits 300 of different sizes, a connection hole for fixing the connection harness 500, and a heat dissipation hole for dissipating heat, and may also include a weight-reducing hole. In addition, this disclosure further provides a vehicle, including the battery pack according to any embodiment described above.

The foregoing descriptions are merely exemplary embodiments of this disclosure, but are not intended to limit this disclosure; and a person skilled in the art understands that this disclosure may have various modifications and variations. Any modification, equivalent replacement, improvement, and the like made without departing from the spirit and principles of this disclosure shall fall within the protection scope of this disclosure.

What is claimed is:

1. A mounting bracket for a cell supervision circuit, comprising:
   a management system mounting part, comprising a management system mounting surface, wherein the management system mounting surface is configured to mount the cell supervision circuit; and
   a thermally conductive part, configured to fit snugly to a container of a battery pack, wherein the thermally conductive part is connected to one end of the management system mounting part, and disposed on a side where the management system mounting surface is located,
   wherein a container mounting part is disposed on two sides of the thermally conductive part, the container mounting part comprises a container mounting surface, the container mounting surface is perpendicular to the management system mounting surface and is adapted for fastening the mounting bracket with the container, and the thermally conductive part protrudes outward with respect to the container mounting part so as to fit snugly to the container.

2. The mounting bracket according to claim 1, wherein the management system mounting part comprises a plurality of through-holes, some of which are mounting holes, and others are spare holes.

3. The mounting bracket according to claim 1, further comprising one or more module pressing parts, wherein each module pressing part is connected to an end of the management system mounting part away from the thermally conductive part, and the one or more module pressing parts and the thermally conductive part are located on two sides of the management system mounting part respectively.

4. The mounting bracket according to claim 3, further comprising a force balancing structure, wherein the force balancing structure is disposed on at least one of the management system mounting part and the one or more module pressing parts.

5. The mounting bracket according to claim 4, wherein
the management system mounting part comprises a plurality of through-holes, some of which are mounting holes, and others are spare holes.

6. The mounting bracket according to claim 3, wherein
the management system mounting part comprises a plurality of through-holes, some of which are mounting holes, and others are spare holes.

7. A battery pack, comprising:
a container;
a plurality of battery modules, each battery module comprising an end plate; and
a mounting bracket comprising:
    a management system mounting part, comprising a management system mounting surface; and
    a thermally conductive part, wherein the thermally conductive part is connected to one end of the management system mounting part, and disposed on a side where the management system mounting surface is located, wherein the management system mounting part is oppositely disposed on one side of the end plate; and the thermally conductive part fits snugly to the container; and
a cell supervision circuit, wherein the cell supervision circuit is mounted on the management system mounting surface,
wherein a container mounting part is disposed on two sides of the thermally conductive part, the container mounting part comprises a container mounting surface, the container mounting surface is perpendicular to the management system mounting surface and is adapted for fastening the mounting bracket with the container, and the thermally conductive part protrudes outward with respect to the container mounting part so as to fit snugly to the container.

8. The battery pack according to claim 7, further comprising one or more module pressing parts, wherein the one or more module pressing parts are connected to an end of the management system mounting part away from the thermally conductive part, and the one or more module pressing parts and the thermally conductive part are located on two sides of the management system mounting part respectively; and
each module pressing part is connected onto and presses adjacent end plates of adjacent battery modules of the plurality of battery modules concurrently.

9. The battery pack according to claim 8, wherein the container comprises an upper container part and a lower container part that engage with each other; and
the container mounting surface is perpendicular to a direction of engaging the upper container part with the lower container part.

10. The battery pack according to claim 9, further comprising a thermally conductive adhesive, wherein the thermally conductive adhesive is disposed on at least one of a side of the management system mounting part away from the management system mounting surface and a surface of the thermally conductive part which fits snugly to the container.

11. The battery pack according to claim 8, wherein the mounting bracket further comprises a force balancing structure, wherein the force balancing structure is disposed on at least one of the management system mounting part and the one or more module pressing parts.

12. The battery pack according to claim 11, wherein
the management system mounting part comprises a plurality of through-holes, some of which are mounting holes, and others are spare holes.

13. The battery pack according to claim 8, further comprising a thermally conductive adhesive, wherein the thermally conductive adhesive is disposed on at least one of a side of the management system mounting part away from the management system mounting surface and a surface of the thermally conductive part which fits snugly to the container.

14. The battery pack according to claim 7, further comprising a thermally conductive adhesive, wherein the thermally conductive adhesive is disposed on at least one of a side of the management system mounting part away from the management system mounting surface and a surface of the thermally conductive part which fits snugly to the container.

15. The battery pack according to claim 7, wherein
the management system mounting part comprises a plurality of through-holes, some of which are mounting holes, and others are spare holes.

16. The battery pack according to claim 7, wherein the container comprises an upper container part and a lower container part that engage with each other; and
the container mounting surface is perpendicular to a direction of engaging the upper container part with the lower container part.

17. A vehicle, comprising a battery pack comprising:
a container;
a battery module, comprising an end plate; and
a mounting bracket comprising:
    a management system mounting part, comprising a management system mounting surface; and
    a thermally conductive part, wherein the thermally conductive part is connected to one end of the management system mounting part, and disposed on a side where the management system mounting surface is located, wherein the management system mounting part is oppositely disposed on one side of the end plate; and the thermally conductive part fits snugly to the container; and
a cell supervision circuit, wherein the cell supervision circuit is mounted on the management system mounting surface,
wherein a container mounting part is disposed on two sides of the thermally conductive part, the container mounting part comprises a container mounting surface, the container mounting surface is perpendicular to the management system mounting surface and is adapted for fastening the mounting bracket with the container, and the thermally conductive part protrudes outward with respect to the container mounting part so as to fit snugly to the container.

* * * * *